Patented Aug. 24, 1937

2,091,105

UNITED STATES PATENT OFFICE 2,091,105

TEXTILE ASSISTANTS AND PROCESS FOR PREPARING THE SAME

Henry Alfred Piggott, Cheadle Hulme, England, assignor to Imperial Chemical Industries Limited, a corporation of Great Britain No Drawing. Application February 8, 1934, Serial No. 710,387. In Great Britain February 15, 1933

16 Claims. (Cl. 260—124)

This invention relates to chemical compounds which are valuable textile assistants, and a process for the manufacture thereof.

It is an object of the present invention to produce new chemical compounds. A further object is to produce new chemical compounds which are valuable detergent agents. A still further object is the production of new chemical compounds which are valuable dispersing agents, wetting-out agents, emulsifying agents, softening agents or vat-retarding agents. Other objects will appear hereinafter.

These objects are accomplished by producing chemical compositions by the process which comprises interacting with an alkylene oxide an amine of the following general formula,

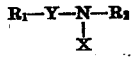

wherein $R_1$ is a straight-chain higher aliphatic radical, that is, one having at least 8 carbon atoms, Y stands for $CH_2$ or CO, X stands for hydrogen or a lower alkyl, while $R_2$ is the radical of a polyhydroxy-alkyl compound containing at least two OH groups. The chemical compositions obtained or obtainable in this way may be converted to further new chemical compositions by treating them with a substance chosen from the group which comprises alkylating agents and esterifying agents to effect partial alkylation or esterification of the free OH groups. A preferred alkylene oxide is ethylene oxide. Preferred amines are water soluble ones. The interaction of the amine and alkylene oxide may be effected by heating, which may be without a catalyst and even without a diluting medium, heating being effected when necessary in a closed vessel. The amine may if desired be used in the form of a salt. When an acylamine is chosen as starting material this should preferably be a carboxylamide or a sulphonamide.

While the invention is susceptible of considerable variation and modification in the manner of its practical application, particularly as regards the specific materials used, the proportion thereof and the method of their preparation, the following examples, in which the parts are by weight, will serve to illustrate some of the products falling within the invention and how they may be prepared.

*Example 1.*—A mixture of 150 parts of N-stearyl-$\beta$, $\beta'$, $\beta''$- trihydroxy-tert.-butylamine with 90 parts of ethylene oxide (5.3 molecular equivalents) is heated in a closed vessel by raising the temperature to 120° C. uniformly during 5 hours, and then keeping at this temperature until the internal pressure falls to zero. The product is a viscid yellow gum which dissolves readily in water to a colourless, faintly alkaline solution.

Addition of this product to an indigo vat lowers the rate of dyeing of material immersed in the vat, and markedly improved the fastness to rubbing of the finished dyeing.

N-stearyl-$\beta$, $\beta'$, $\beta''$-trihydroxy-tert.-butylamine may be prepared by heating together $\beta$, $\beta'$, $\beta''$-trihydroxy-tert.-butylamine (cf. Piloty and Ruff, Ber., 1897, 30, 1665, 2072) and stearic acid as described in my copending application Ser. No. 715,776, now Patent No. 1,985,424 issued December 25, 1934.

*Example 2.*—50 parts of N-cetyl-$\beta$, $\beta'$, $\beta''$-trihydroxy-tert.-butylamine hydrobromide and 50 parts of ethylene oxide (9.7 molecular equivalents) are heated together under the conditions of the previous example. A brown semi-solid body is produced, readily soluble in water to a pale-yellow solution.

N-cetyl-$\beta$, $\beta'$, $\beta''$-trihydroxy-tert.-butylamine hydrobromide may be prepared by heating $\beta$, $\beta'$, $\beta''$-trihydroxy-tert.-butylamine with cetyl bromide at 160° C., and separating from the dicetyl derivative simultaneously formed by dissolving in methyl alcohol and filtering.

*Example 3.*—Methylcetylglucamine (60 parts) and ethylene oxide (60 parts) are heated together under the same conditions as in Example 1. The product is a dark brown semi-solid mass, readily soluble in water to an alkaline solution. It is a valuable dispersing and emulsifying agent.

Methylcetylglucamine is prepared by reacting together methylamine and glucose in the presence of nickel and hydrogen at 70–100°/1000 lbs. per sq. in., and combining the resulting methylglucamine with cetyl bromide.

*Example 4.*—The product from Example 3 is heated with one third of its weight of the chloride of stearic acid and one sixth of its weight of pyridine at 120° C. for ½ hour and cooled. The resulting solid product is a white, waxy substance, which dissolves in water to a strongly foaming solution.

*Example 5.*—125 parts of the product of Example 3 are heated with 57 parts of stearic acid, the temperature being gradually raised from 140–160° C. over a period of 6 hours. By the end of this time a completely water-soluble product is formed.

*Example 6.*—A mixture of 22 parts of $\beta$, $\gamma$-dihydroxy-n-propylamine and 66 parts of stearic acid is stirred at 100° C. until combination to a water-soluble soap has occurred. This is then heated at 190° C. until water is no longer evolved and the product is completely soluble in benzene. On cooling a white waxy solid, soluble in hot water to a solution which sets to a gel on cooling is obtained. 80 parts of this product are heated with 60 parts of ethylene oxide in a closed vessel until the internal pressure falls to zero. A white solid of somewhat lower melting point is thus obtained. It is readily soluble in cold water to a clear solution and has powerful emulsifying and dispersing properties. When added to an indigo vat it causes a slight brightening in the shade of the dyed fabric and markedly improves its fastness to rubbing.

As many apparently widely different embodiments of this invention may be made without departing from the spirit and scope thereof, it is to be understood that we do not limit ourselves to the specific embodiments thereof except as defined in the following claims.

I claim:

1. In a process for producing textile assistants, the step which comprises reacting with an alkylene oxide upon a long-chain aliphatic nitrogenous organic compound of the general formula

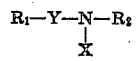

wherein $R_1$ is a straight-chain higher aliphatic radical, Y is a member of the group consisting of $CH_2$ and CO, X is a member of the group consisting of hydrogen and the lower alkyls, while $R_2$ is the radical of a polyhydroxy-alkyl compound containing at least two OH groups.

2. A process as in claim 1, wherein the amine is employed in the form of a hydrohalide.

3. A process as in claim 1, the proportion of alkylene oxide to the amine employed being not less than 5 mols of the former to 1 mol. of the latter.

4. A process for producing textile assistants, which comprises reacting with an alkylene oxide upon a long-chain aliphatic nitrogenous organic compound of the general formula

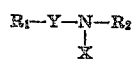

wherein $R_1$ is a straight-chain higher aliphatic radical, Y stands for a member of the group consisting of $CH_2$ and CO, X stands for a member of the group consisting of hydrogen and the lower alkyls, while $R_2$ is the radical of a polyhydroxy-alkyl compound containing at least two OH groups, and partially esterifying the intermediate reaction product thus obtained.

5. The process of producing a textile assistant which comprises heating together in a closed vessel from about 5 to about 10 molar proportions of ethylene oxide and about 1 molar proportion of a compound of the general formula

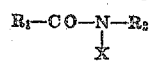

wherein $R_1$ is a higher aliphatic radical having from 15 to 17 carbon atoms, X stands for a member of the group consisting of hydrogen and methyl, and $R_2$ stands for a polyhydroxy-alkyl radical having not more than 6 carbon atoms and not less than two OH groups.

6. The process of producing a textile assistant which comprises heating together in a closed vessel from about 5 to about 10 molar proportions of ethylene oxide and about 1 molar proportion of a compound of the general formula

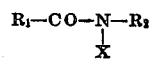

wherein $R_1$ is a higher aliphatic radical having from 15 to 17 carbon atoms, X stands for a member of the group consisting of hydrogen and methyl, and $R_2$ stands for a polyhydroxy-alkyl radical having not more than 6 carbon atoms and not less than two OH groups, and then heating the reaction product with from one-third to about one-half of its own weight of a higher aliphatic-acid esterifying agent to effect partial esterification.

7. The process which comprises heating N-stearyl - $\beta$, $\beta'$, $\beta''$ - trihydroxy - tertiary - butyl - amine with not less than about 5 molecular equivalents of ethylene oxide, in a closed vessel at about 120° C. until the increased pressure within the vessel has substantially subsided, and recovering the reaction product.

8. The compounds obtainable by the process defined in claim 1.

9. The compounds obtainable by the process defined in claim 4.

10. The compounds obtainable by the process defined in claim 5.

11. The compounds obtainable by the process defined in claim 6.

12. The compounds obtainable by the process defined in claim 7.

13. A compound of the series obtainable by reacting ethylene oxide with a compound of the general formula

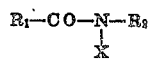

wherein $R_1$ represents a higher alkyl radical, X stands for a member of the group consisting of hydrogen and methyl, and $R_2$ stands for a polyhydroxy lower alkyl radical containing at least two OH groups.

14. The partial esterification product of a compound as defined in claim 13 with a higher aliphatic acid.

15. The condensation product of N-stearyl-$\beta$, $\beta'$, $\beta''$ - trihydroxy - tertiary - butalamine with about 5 mols of ethylene oxide.

16. The condensation product of N-cetyl-$\beta$, $\beta'$, $\beta''$ - trihydroxy - tertiary - butylamine - hydrobromide with about 10 mols of ethylene oxide.

HENRY ALFRED PIGGOTT.